Figure 4:
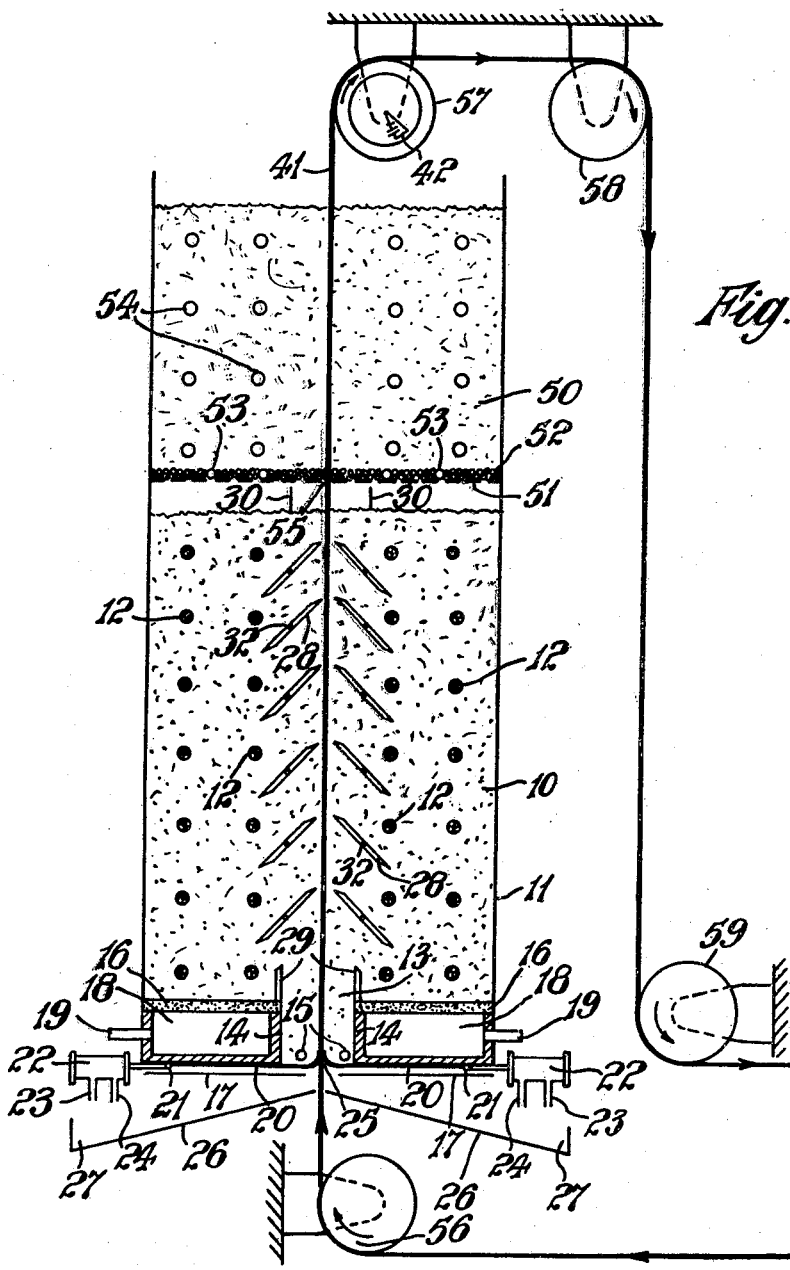

Nov. 6, 1962 — R. S. GOY ET AL — 3,061,941
APPARATUS FOR THE HEAT TREATMENT OF THERMOPLASTIC MATERIALS
Filed Aug. 12, 1958 — 4 Sheets-Sheet 1
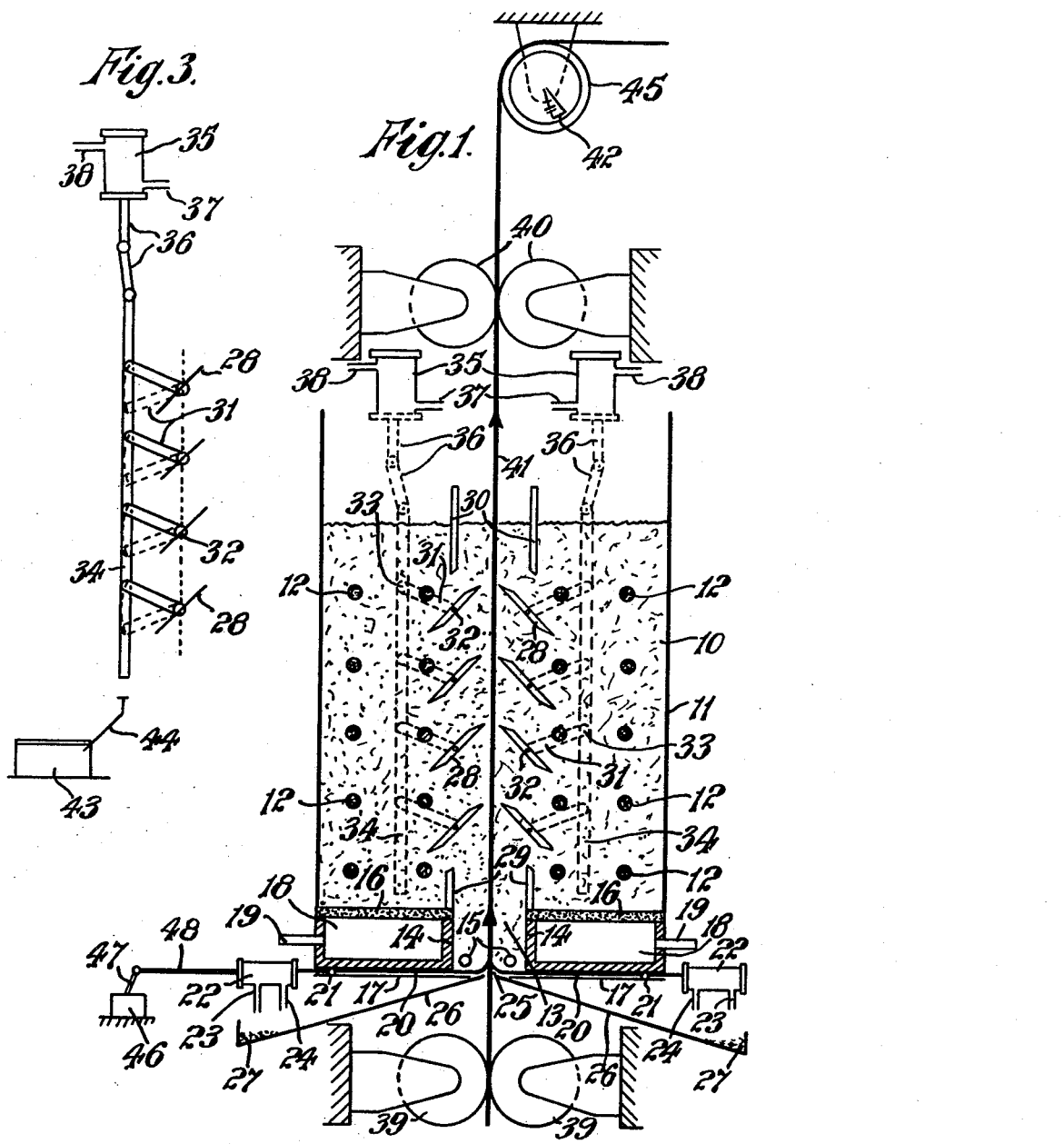
INVENTORS
Ronald Stansfield Goy
Peter Lothar Ernst Möring
by Benj. T. Rauber
their attorney

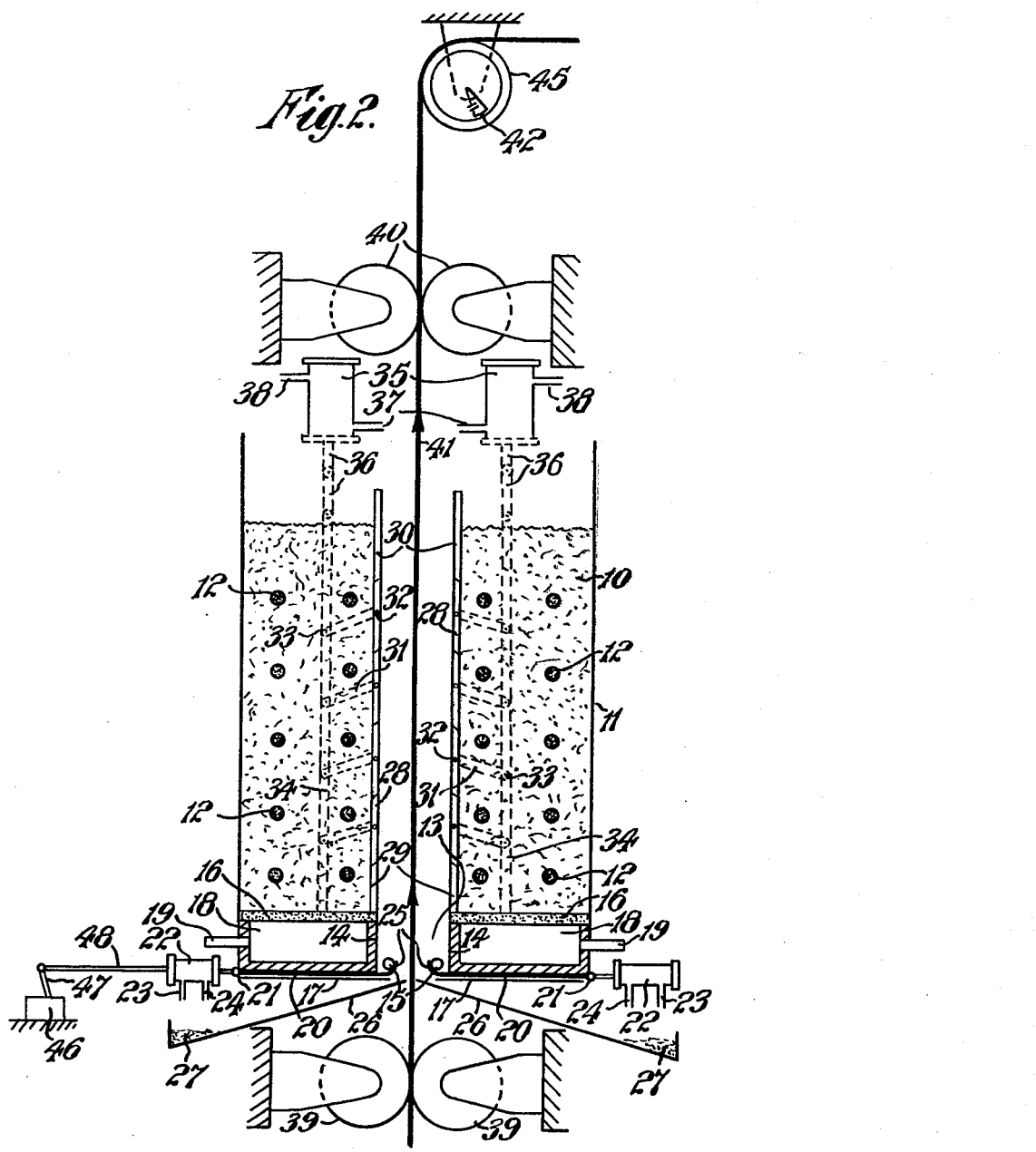

Nov. 6, 1962 R. S. GOY ET AL 3,061,941
APPARATUS FOR THE HEAT TREATMENT OF THERMOPLASTIC MATERIALS
Filed Aug. 12, 1958 4 Sheets-Sheet 3

INVENTORS
Ronald Stansfield Goy
Peter Lothar Ernst Moring
by Benj. T. Rauber
their attorneys

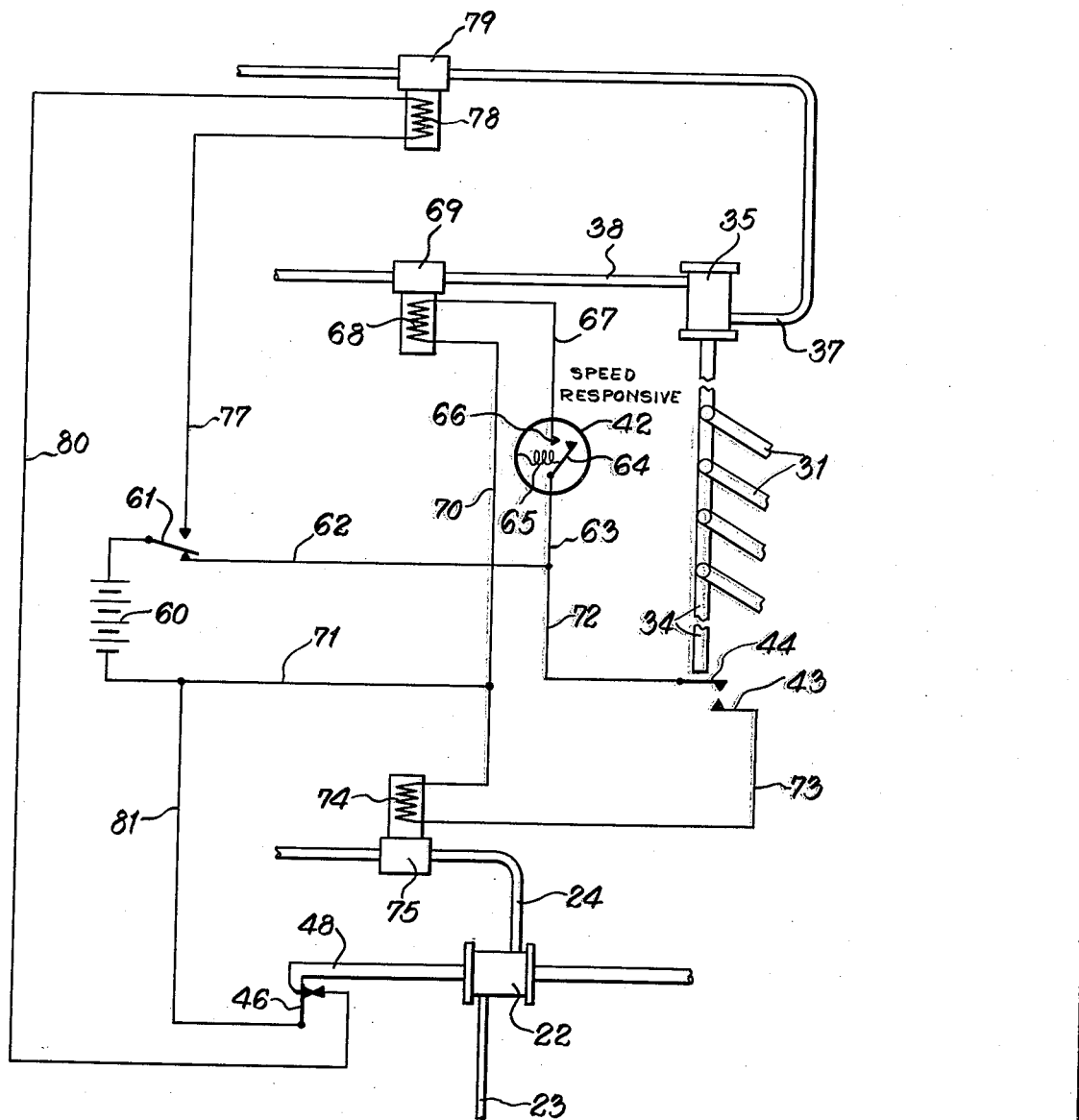

United States Patent Office 3,061,941
Patented Nov. 6, 1962

3,061,941
APPARATUS FOR THE HEAT TREATMENT OF THERMOPLASTIC MATERIALS
Ronald Stansfield Goy, Castle Bromwich, near Birmingham, and Peter Lothar Ernst Möring, Erdington, Birmingham, England, assignors, by mesne assignments, to Dunlop Tire and Rubber Corporation, Buffalo, N.Y., a corporation of New York
Filed Aug. 12, 1958, Ser. No. 754,544
Claims priority, application Great Britain Aug. 17, 1957
18 Claims. (Cl. 34—48)

This invention relates to apparatus for the heat treatment of thermoplastic material, especially textile materials, and more particularly to apparatus of the type comprising a container having therein a bed of solid particles, means for the introduction of a gas to maintain the bed in the fluidised condition and means for heating or cooling the fluid bed. Apparatus of this type will be referred to in this specification and in the claims as apparatus of the type herein defined.

In the heat treatment of thermoplastic material, such as textile materials, a method of heating or cooling such materials which has been found to be particularly advantageous consists in passing them through a fluidised bed heated or cooled to the desired temperature. The chief advantages of such a method lie in the high degree of heat transfer which can be obtained from the bed to the thermoplastic materials or vice versa and in the accuracy of the control of the temperature of the materials which can be obtained. A disadvantage of this method is that in the event of a stoppage of the feeding means for the thermoplastic material, that portion of the material which is immersed in a heated fluid bed may be subjected to very high temperatures which could cause degradation of the material.

It is an object of this invention to provide an apparatus for the heat treatment of thermoplastic materials in a fluid bed wherein the risk of overheating of the material in the event of a stoppage of the feeding mechanism is reduced.

According to the present invention an apparatus of the type herein defined comprises a fluid bed container having an orifice in the base thereof for the passage of thermoplastic material through the fluid bed, movable sealing means adapted to be moved to a closed position in which the space between the thermoplastic material and the edges of said orifice is covered and to an open position in which part or the whole of said space is uncovered, movable vanes situated in the fluid bed and adapted to be moved to a closed position in which they enclose that portion of the fluid bed adjacent the textile material, thereby preventing the remainder of the fluid bed from reaching the orifice and to an open position in which they permit free passage of the fluid bed particles over said orifice.

Preferably the sealing means comprises at least two planar members mounted on opposite sides of the orifice in contact with the base of the container and mounted to slide to a closed position in which the inner edges thereof make contact with the thermoplastic material thereby preventing egress of fluid bed particles. The orifice can have a variety of shapes, but is usually substantially rectangular.

Normally there are situated at least two movable vanes in the fluid bed each extending across the container and arranged to rotate about a longitudinal axis of the vane, said vanes being mounted on opposite sides of the orifice and the lowest edges thereof being arranged to make contact with the upper surface of the member containing the orifice. A plurality of vanes is preferably arranged on each side of the orifice mounted with their axes of rotation arranged in rows substantially parallel to the thermoplastic material with each vane in contact with the next adjacent vane.

The movable vanes can be arranged to be moved to the closed position by rotating them about their longitudinal axes to bring them in a plane substantially parallel to the thermoplastic material with each vane in contact with the next adjacent vane. On the other hand, when the vanes are similarly rotated to an angle of approximately 45° with the thermoplastic material they are regarded as being in the open position.

Preferably the apparatus includes automatic means for moving the vanes to the closed position and moving the sealing means to the open position. The automatic means can be driven by compressed air, and is generally arranged so that the movable vanes obtain substantially the closed position before the sealing means commences to open. Furthermore, it is also preferable that means are provided which operate the automatic means when the speed at which a thermoplastic material passing through the fluid bed falls below a predetermined rate.

While air is the gas which is normally used to maintain the bed in the fluid condition, nitrogen and other inert gases have also proved suitable for this purpose.

The invention will be illustrated by the following description of two forms of apparatus for the heat setting of textile materials such as nylon or polyester resin materials and the method of operation of such apparatus, with reference to the accompanying drawings.

In the drawings, in which like numerals denote like parts throughout,

FIGURE 1 is a sectional elevation of an apparatus suitable for carrying out the heat setting of textile materials showing the vanes and sealing means in the operating position, FIGURE 2 is a sectional elevation of the same apparatus showing the vanes in the closed position and the sealing means in the open position, FIGURE 3 is an elevation of the means for rotating the vanes, FIGURE 4 is a sectional elevation of an apparatus similar to that shown in FIGURES 1 and 2 which incorporates a second fluidised bed arranged to cool the textile material, and FIGURE 5 is a diagram.

Referring to FIGURES 1, 2 and 3 the apparatus comprises a bed 10 of small particles of smooth sand or ballotini having a diameter of, for example, 200 to 500 microns held in a container 11 of rectangular cross-section, within which are suitably spaced electrical elements 12 for heating the bed 10. Alternatively, coils for carrying heating or cooling fluids can be used instead of electrical elements.

Situated horizontally at the base of the bed 10 are porous tiles 16 and below these there are provided air chambers 18 having connections 19 whereby air can be admitted to the bed.

Alternatively, the porous tiles 16 and air chambers 18 can be replaced by an arrangement of pipes with vents for supplying fluidising air to the bed. At the base of the apparatus there is an orifice 13 extending across the whole width of the container 11 and formed by a space between porous tiles 16 and the vertical sides 14 of chambers 18. The orifice 13 is extended into the bed 10 by two parallel vertical shutters 29 which make contact with the porous tiles 16. Situated adjacent the edges of orifice 13 are two pipes 15 each provided with vents for admitting air to the orifice.

Immediately beneath orifice 13 there is provided a seal consisting of two slidable planar members 20 the outer edges 21 of which are each connected to pistons (not shown) situated within cylinders 22. The planar members 20 can be made to slide to the position shown in FIGURE 1 by means of compressed air supplied to the cylinders 22 through air pipes 23, thereby fully covering the orifice 13. By supplying air to pipes 24 planar members 20 can be made to slide to the position shown in FIGURE 2, thereby uncovering orifice 13. The inner edges of the sliding members 20 are provided with flexible jaws 25 of rubber or like material to prevent the egress of particles of the bed 10 as the textile material passes through the seal. Alternatively, these may take the form of a fine comb. A pair of trays 26 is also disposed below the planar members 20, each extending under an opposing half of the container 11 and both having bases inclined at an angle to the container such that the particles which are discharged from the bed readily collect at the tray edges 27.

In an alternative embodiment of the invention the sealing means comprising two slidable planar members can be replaced by a closure for the base of the fluid bed container as described in our co-pending application Ser. No. 790,676, filed February 2, 1959, which comprises a pair of rollers in peripheral contact adapted to permit the passage of sheet material therebetween and means to prevent the egress of particles of the bed through the space between the casing of the closure and the peripheral portions of each of the rollers adjacent thereto.

Situated vertically above the orifice there are provided four pairs of flat vanes 28 each extending across the width of the container and arranged to rotate about a horizontal axis 32 situated in the centre of each vane 28. These extend in two vertical rows above the orifice 13. Immediately above the two rows of axes 32 there are situated two fixed vertical shutters 30 which extend above the surface of the bed 10. To the axis 32 of each movable vane 28 there is connected a lever 31 having its other end 33 connected to a rod 34 which is coupled by links 36 to a piston (not shown) located in a cylinder 35 having air feeds 37 and 38. When compressed air is supplied to cylinders 35 through air feeds 38 the pressure compels movement of rod member 34 downwards with simultaneous rotation of levers 31, and vanes 28.

The vanes are of such dimensions that when rotated about axes 32 to bring them in a vertical plane they each contact the adjacent vanes. The lowest vanes adjacent the orifice and the uppermost vanes adjacent the top of the fluid bed also contact respectively vertical shutters 29 and fixed shutters 30. In this way, when the vanes 28 are closed, the whole of that portion of bed 10 situated above orifice 13 is directly enclosed, as shown in FIGURE 2. When compressed air is supplied to feeds 37 the vanes 28 are rotated to an angle of approximately 45° with the vertical, as shown in FIGURE 1, thereby permitting free circulation of the bed particles.

In addition, a pair of nip rollers 39 is provided for feeding a textile material 41 through the orifice 13 and therefore through bed 10 while a second pair of nip rollers 40, adapted to be driven at a higher speed than rollers 39, is provided by means of which the material is withdrawn from bed 10 under tension. Rollers 40 should be situated at a distance from the top of bed 10 sufficient to allow adequate cooling and setting of the material 41.

The material 41 passes over an idler roller 45 to a take-up roll (not shown). A centrifugal switch 42 is fitted to roller 45 and arranged so that it is in the off-position during normal running of the apparatus and in the on-position when the speed at which the textile material is fed over roller 45 falls below a predetermined rate. In the latter event, switch 42 closes an electrical circuit which energises a solenoid-operated compressed air valve, thereby supplying compressed air to feed pipe 38 and closing vanes 28. The lower end of rod 34 makes contact with a spring-loaded lever 44 of an electrical switch 43. When lever 44 is depressed it closes switch 43 thereby energising a second solenoid-operated compressed air valve (not shown) which supplies compressed air to feed pipes 24 thus causing planar members 20 to move to the open position. A further switch 46 is arranged at the end of one of the cylinders 22 and the contact arm 47 of the switch is connected to a rod 48 which is in turn connected to the piston in cylinder 22. Switch 46 is arranged so that it is in the on position when the sliding member 20 connected to rod 48 is in the fully closed position and then energises a solenoid-operated valve which supplies compressed air to cylinders 35 via pipes 37.

A switch is provided at the motor control so that by hand operation it de-energises the centrifugal switch 42 and switch 43 and consequently the valve supplying air to feed pipes 38 and 24 thereby releasing the pressure in cylinders 22 and 35.

An electrical system for controlling the switch 42 and the cylinders 22 and 35 is shown in FIG. 5. In this system electric energy is supplied from a source 60 through a double throw switch 61 normally connecting the source to a lead 62, thence through a branch lead 63 to an arm 64 of the speed responsive switch 42. When the speed of the fabric slackens to an extent to release the arm 64 a spring 65 draws the arm 64 to contact a terminal 66 of the switch 24 thereby connecting the branch lead 63 to a lead 67 thence through a solenoid 68 of an electro-magnetically controlled valve 69 in the feed pipe 38 to admit pressure fluid to the cylinder 35 and close the vanes 32. The circuit through the solenoid 68 is completed by a return branch 70 and lead 71 to the source 60.

A second branch lead 72 leads from the main lead 62 to the switch 44. When the switch is closed, it closes a circuit through a lead 73 to the solenoid 74 of an electrically controlled valve 75 in the supply main 24 leading to the cylinder 22 to withdraw the slidable members 20. The circuit through the solenoid 74 is completed by a return branch 76 leading to the return lead 71.

When the dampers 28 are to be moved to closed position and the fabric is to be drawn through the apparatus, the double throw switch 61 is swung away from the lead 62 to a lead 77 to connect the source 60 to the solenoid 78 of an electrically controlled valve 79 to admit fluid to the fluid conduit 37 and cylinder to tilt the vanes 28 to open position. A return lead 80 leads to the switch 46 and thence through the branch lead 81 to the return lead 71 to the source 60.

In operation, compressed air is supplied to connections 19 whence it passes into chambers 18 and through porous tiles 16 whereby the bed is maintained in the fluid condition. Air is also supplied to pipes 15 and passes through the fluidising vents. The heating elements 12 are brought into operation. Textile material 41, such as a nylon cord fabric, is fed through the first pair of nip rolls 39, through the orifice 13, up through the fluidised bed 10, through the second pair of nip rollers 40 and over roller 45. The temperature of the bed 10 is adjusted to the operating conditions and the two planar members 20 arranged so that the rubber jaws 25 thereof just touch the fabric passing through them and prevent particles of the bed passing out through the orifice. The movable vanes 28 are arranged in a position at an angle of approximately 45° to the vertical. As the fabric passes through the apparatus it is rapidly heated to the desired temperature and in view of the difference in speed of the two pairs of nip rollers stretching takes place in the fluid bed.

If the speed at which the textile material 41 is fed into the apparatus should fall below a predetermined figure or if the material breaks, then centrifugal switch 42 is automatically moved to the on-position and compressed air is supplied to the cylinders 35 through the air pipes 38 and the movable vanes 28 are rotated to the vertical position, thereby enclosing the portion of fluid bed adjacent the fabric 41. As the vanes reach their final position the rod member 34 depresses the spring lever 44 which actuates switch 43 and causes compressed air to be automatically supplied to the cylinders 22 through the air feeds 24. This causes the planar members 20 to slide apart thereby opening the seal and uncovering the orifice 13. The portion of the fluid bed enclosed between the movable vanes 28 then falls through orifice 13, thereby removing the heated bed out of contact with the fabric and the bed so discharged is collected in the pair of trays 26. Moreover, since the apparatus is arranged so that fluidising air is provided in the region of the orifice through the pipes 15, air will pass up through the enclosed space between the vanes and rapidly cool the fabric situated therein, thereby preventing degradation or other damage to the fabric consequent on the stoppage of the feeding means.

In order to restart the apparatus the portion of the fluid bed collected in the pair of trays 26 is replaced in equal portions in each half of the main fluid bed 10 on either side of the enclosed space between the vanes. The temperature of the bed is then adjusted to the operating conditions. The switch at the motor control is set to de-energise centrifugal switch 42 and switch 43, thereby releasing the air from cylinders 22 and 35. Air is then admitted by hand operation to cylinder 22 via pipes 23 thereby closing the seal onto the textile material. As the members 20 reach the closed position rod 48 operates switch 46 and causes compressed air to be fed to pipes 37 and cylinders 35 which operates rod 34 to rotate vanes 28 to the open position. Switch 43 then assumes the off-position. Finally the pressure in cylinders 22 and 35 is released, the motor switch is placed in a position to energise switches 42 and 43 and normal operation is then resumed.

Referring to FIGURE 4, an apparatus suitable for carrying out the heat setting and subsequent rapid cooling of the textile material comprises an apparatus of the form shown in FIGURES 1 and 2 in which the container 11 is extended vertically to hold a second fluidised bed 50 arranged to cool the fabric 41. The two fluid beds 11 and 50 are divided by a gauze 51 on which is placed a layer of spheres 52 of relatively large diameter, e.g. 7 mm., such that they do not pass through the gauze and also prevent particles of the cooling bed 50 from passing through the heating bed 10 situated below. The cooling bed 50 which is of smooth sand or like material rests on the large diameter spheres 52 and is provided with vents 53 for fluidising air and coils 54 through which a cooling liquid, e.g. water, can be circulated. The layer of gauze 51 separating the two beds is provided with a central slot 55 through which the material to be treated is passed and this slot may have any suitable sealing means, such as combs or rubber jaws, provided at the edges in order to prevent particles of the fluid bed from passing through the slot. This seal need not be capable of opening as in the apparatus described in FIGURES 1 and 2. The textile material 41 is introduced to the heating bed over single roller 56 and on leaving the cooling bed passes over a second single roller 57 having attached thereto a centrifugal switch 42 and then over guide rollers 58 and 59. Additional rollers (not shown) are also provided so that a stretching force can be applied to the textile material as it passes through the apparatus. The means for rotating the vanes 28 is as shown in FIGURES 1, 2 and 3 but is not specifically illustrated.

In operation, after passing over the first single roller 56, the textile fabric 41 is passed through the heated fluid bed 10 in the lower part of the apparatus, then through the slot 55 in the gauze layer 51, through the second fluid bed 50 which is cooled by water circulating through the cooling coils 54, and then over the second single roller 57. In its passage through the heated bed 10 the fabric 41 is heated to the desired temperature and stretched. On leaving the heated bed 10 it passes immediately into the second fluid bed 50 where it is rapidly cooled to a temperature at which the stretched fabric is stabilised to prevent relaxation when the tension is released and to prevent any degradation of the fabric which might take place due to retention of heat by the fabric after leaving the hot zone. If the speed at which the textile material is fed through the apparatus falls below a predetermined figure the fabric is removed from contact with the heated bed by operation of the movable vanes and seal associated therewith in the manner previously described as for FIGURES 1 and 2, but it is not necessary to provide means for removing the fabric from contact with the cold bed 50 since no damage will be caused thereby.

A very valuable advantage that is obtained in carrying out the heat setting of textile materials in an apparatus according to the invention is that in view of the accurate temperature control which can be obtained, the material can be heated to a temperature very close to its melting point, thereby ensuring that the full amount of stretch can be imparted to the material. In such a method of operation, however, it is very desirable that the textile material should be cooled rapidly as soon as the stretching has taken place. The present inventioin enables this to be carried out in a simple and advantageous manner, owing to the fact that the textile material is treated in a single pass through the apparatus.

The apparatus of this invention can be used for the heat-setting of various thermoplastic materials, such as nylon, polyester resins, and polyvinyl resins (including polyvinyl alcohol). The term "textile materials" as used herein includes fibres, yarns, cords, fabrics and sheet materials.

Having now described our invention, what we claim is:

1. Apparatus comprising a container for a bed of solid particles, means for the introduction of a gas to maintain the bed in a fluidized condition and means for changing the temperature of the bed, a top opening in the container, and a container base defining an orifice for the passage of solid particles of said bed and a continuous length of thermoplastic material through the bed, sealing members movable at the base transversely of the orifice to span and close the orifice against the passage of solid particles of said bed and to an open position in which the orifice is uncovered, and partition means situated in the container and extending upwardly from opposite sides of said orifice and extending across the width of the container and movable to form a substantially imperforate wall to close the portion of the container above said orifice and adjacent to the path of the thermoplastic material from the passage of particles from the remainder of the container when the sealing means is moved to the open position, and to a position in which free passage of the fluid bed particles to the said portion of the container above said orifice and adjacent to the path of the thermoplastic material is permitted when the sealing members close the orifice.

2. The apparatus of claim 1 in which the means for changing the temperature of the bed is a heating means and which has a cooling means for said thermoplastic material comprising fluidized bed above said first mentioned bed, cooling means in said upper fluidized bed and a gas permeable partition between said first mentioned bed and said upper fluidized bed for the passage of gas upwardly therethrough, said partition having a passage for the thermoplastic material.

3. Apparatus according to claim 1 wherein the sealing means comprises at least two planar members mounted on opposite sides of the orifice in contact with the base of the container and arranged to slide to a closed position in which the inner edges thereof make contact with the thermoplastic material thereby preventing egress of fluid bed particles.

4. Apparatus according to claim 3 wherein the planar members comprise flexible jaws attached to the inner edges thereof and contacting the thermoplastic material.

5. Apparatus according to claim 1 wherein the orifice is substantially rectangular in shape.

6. Apparatus according to claim 1 in which said partition means comprises at least two movable vanes on opposite sides of the orifice each extending horizontally across the container and arranged to rotate about a longitudinal axis of the vane to form a partition on opposite sides of the orifice.

7. Apparatus according to claim 6 containing a plurality of vanes on each side of the orifice and mounted with their axes of rotation arranged in rows substantially parallel to the path of the thermoplastic material.

8. Apparatus according to claim 7 wherein the movable vanes are each arranged to be moved to the closed position by rotating them about their longitudinal axes to bring them in a plane substantially parallel to the thermoplastic material with each vane in contact with the next adjacent vane.

9. Apparatus according to claim 8 wherein the movable vanes are each arranged to be moved to the open position by rotating them about their longitudinal axes to an angle of approximately 45° with the thermoplastic material.

10. Apparatus according to claim 7 comprising means for moving all of the movable vanes to the closed position simultaneously.

11. Apparatus according to claim 7 comprising automatic means for moving the vanes to the closed position and moving the sealing means to the open position.

12. Apparatus according to claim 11 wherein the said actuating means is driven by compressed air.

13. Apparatus according to claim 11 comprising control means actuated by the speed of said thermoplastic to operate said actuating means when the speed at which a thermoplastic material passing through the fluid bed falls below a predetermined rate.

14. Apparatus according to claim 13 wherein the means for operating said automatic means comprises an idler roller over which the thermoplastic material passes, a centrifugally operated electric switch fitted to said idler roller to close an electrical circuit when the speed at which the thermoplastic material passing over said roller falls below a predetermined rate, and means controlled by said switch to supply compressed air to close the movable vanes.

15. Apparatus according to claim 14 in which said switch is so arranged that the electrical circuit controlling the supply of compressed air for opening the sealing means can be energised only when the movable vanes are in a substantially closed position.

16. Apparatus according to claim 11 wherein the actuating means for moving the vanes and sealing means are arranged so that the movable vanes attain substantially the closed position before the sealing means commences to open.

17. Apparatus according to claim 1 wherein the fluid bed consists of smooth sand having a particle size of from 200 to 500 microns.

18. Apparatus according to claim 1 which comprises means for feeding the thermoplastic material to the fluidized bed and removing it therefrom at a faster speed to stretch it while in said fluidized bed.

References Cited in the file of this patent

UNITED STATES PATENTS

| | | |
|---|---|---|
| 2,669,031 | Chase et al. | Feb. 16, 1954 |
| 2,785,478 | Audas et al. | Mar. 19, 1957 |
| 2,807,096 | Kullgren et al. | Sept. 24, 1957 |
| 2,938,276 | Doleman et al. | May 31, 1960 |